Jan. 21, 1964    J. K. STUESSEL ETAL    3,118,558
ACCESSORIES FOR ELECTRICAL WIRING SYSTEMS
Filed Oct. 3, 1962
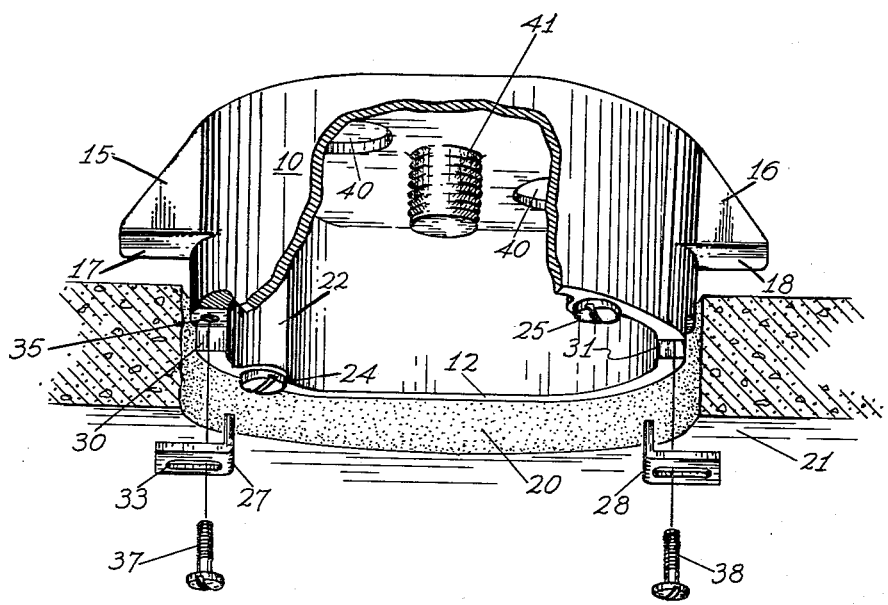
Fig. 1
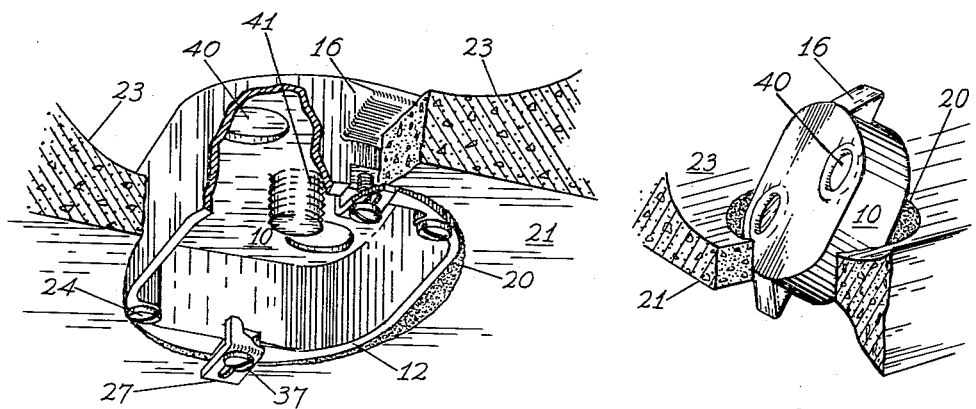
Fig. 2
Fig. 3
INVENTORS
JOHN K. STUESSEL
GLENN K. SEGERLUND
BY
ROBERT L. KAHN
their Atty.

United States Patent Office 3,118,558
Patented Jan. 21, 1964

3,118,558
ACCESSORIES FOR ELECTRICAL WIRING SYSTEMS
John K. Stuessel and Glenn K. Segerlund, Dayton, Ohio, assignors to Flexiflor Electrical Systems, Inc., Dayton, Ohio, a corporation of Ohio
Filed Oct. 3, 1962, Ser. No. 228,198
1 Claim. (Cl. 220—3.4)

This invention relates to accessories for electrical wiring systems and more particularly to an outlet section box adapted but not limited to use with hollow core precast concrete slabs.

Long precast concrete slabs having passages therethrough for the full length of such slabs are well known and widely used. An example of such a slab is disclosed in United States Patent No. 2,299,070. Such precast slabs are used to provide a ceiling for the region below such slabs and a floor or a sub-floor for the regions above such slabs and are sometimes used to form side walls with the slabs running either vertically or horizontally. The passages in such precast slabs may be useful for electric wiring, in which case it is desirable to provide access passages from the slab longitudinal passages to the exteriors of the slabs. This will make it possible to have wires within the slab brought out to the exterior face of a slab at region intermediate the length of the slab.

The outlet box forming the subject matter of the present invention and herein described is particularly suited for use with such precast slabs. An important advantage of the present invention is the ease with which the new outlet box may be inserted through an access passage into the longitudinal slab passage and thereafter positioned and locked in the slab. In order that the invention may be disclosed and understood, it will be described in conjunction with drawings wherein:

FIGURE 1 is an exploded perspective view of the new outlet box and hardware, the box being within a portion of a precast slab just prior to positioning therein.

FIGURE 2 is a perspective view, with certain parts broken away, of the new outlet box installed in a concrete slab.

FIGURE 3 is a perspective view of the outlet box being guided through a slab passage.

The new outlet box is of metal or other suitable rigid material and consists of body 10 having edge 12. Box 10 as viewed from the open end thereof is generally oval shaped. For convenience, the dimension of the box along the major axis of the generally oval shape will be referred to as the length of the box, with the dimension along the minor axis perpendicular thereto being referred to as the width. Box 10 has integral supporting lugs 15 and 16 extending laterally from the exterior of the box along lines parallel to the length of the box. Lugs 15 and 16 as seen from the side of the box have a generally triangular shape, with each lug flaring out laterally from the bottom of the box to provide support faces 17 and 18. Support faces 17 and 18 are disposed partway along the height or depth of the box and lie in a plane which is parallel to but offset from the plane of box edge 12. Faces 17 and 18 are preferably slotted or roughened.

The depth of box 10 is substantially less than the maximum length of the box body including lugs 15 and 16. This difference in length over depth permits box 10 to be inserted sideways into access opening 20 in precast concrete slab 21, with the box length longitudinally of the access passage. Box 10 can thus be positioned within longitudinal passage 23 of the slab. It is understood that longitudinal passage 23 of the slab has a diameter much greater than the diameter of access passage 20 to permit box 10 to be turned sideways into proper position after being inserted within the slab. The box will be oriented so that supporting faces 17 and 18 of the lugs will be disposed longitudinally of the slab. The cylindrical wall of the slab will present straight lines lengthwise of the box. As FIGURES 1 and 2 show, lug support faces 17 and 18 will overhang the concrete slab material within the slab bordering the access passage and brace the box against removal from the slab. It is understood that the length of box 10 (exclusive of lugs 15 and 16) is a bit less than the diameter of access passage 20.

Box 10 is provided with inwardly directed bosses 22 which extend parallel to the depth of the box and have tapped recesses for accommodating bolts 24 and 25. These bolts are used to fasten box covers and are conventional. These bosses are offset from the longitudinal box center line.

It is necessary to provide means for locking box 10 against movement of the box into the slab. This is provided by small angle irons 27 and 28 which can fit into slots 30 and 31 of edge 12 of the box. Slots 30 and 31 are preferably disposed along the longer axis of the box opening and each slot is wide enough and deep enough to accommodate its angle iron. Each angle iron has slotted portion 33 extending longitudinally of the box when the angle irons are in position.

At the bottom of slots 30 and 31 of the box are tapped recesses 35 for receiving bolts 37 and 38. It is understood that the box wall is thick enough to permit such recesses. Bolts 37 and 38 are adapted to pass through the slotted parts of the angle irons and when threaded into the tapped recesses can be used to lock a box in position. After the box is in position in the slab, the angle irons are adjusted so that the free slotted ends overlap the bottom face of slab 21. Initially, the angle irons will have the slotted parts in the innermost positions as part of the packaged box. Thus the angle irons and the bolts will not be lost as is usual when they are separated. In this initial position, the angle irons will not project beyond the box sides. After installation, bolts 37 and 38 can be loosened for the purpose of adjusting the distance of the slotted parts from edge 12 to bring the slotted portion of each angle iron just below the slab face, and the angle irons can also be moved outwardly to overlie the concrete beyond the length of the box. This can be accomplished without losing the bolts or angle irons.

The outlet box can be provided with one or more knockout holes 40 in the bottom wall thereof and may have threaded stud 41 projecting inwardly of the bottom. Threaded stud 41 may have lighting fixtures hung therefrom or may be used as desired. Wires within the longitudinal passage of slab 21 may be pulled through one or more openings 40 in the box and connections may be made in box 10 in conventional fashion. A cover for box 10, not shown, may be tightly locked in position by bolts 24 and 25. Such cover may be slotted to clear the angle iron slotted portion 33 or a cover for both the box and access box 20 may be provided to be maintained into position by bolts 24 and 25.

What is claimed is:

An outlet box of rigid material, said box having a flat bottom with upstanding sides terminating in an edge lying in a plane parallel to the box bottom, said box having a generally oval shape, said box having triangular lateral extensions aligned on the long axis of the box with the extensions tapering from the box bottom away from the box side to a plane parallel to the box bottom and laterally offset intermediate the box depth, said box having slots in the box edge aligned along the long axis, said slots having tapped recesses to accommodate bolts directed along the box depth, an angle iron for each slot, said angle iron being slotted and being slidable in said box slot along the major axis, said bolts serving to retain said slotted angle irons in adjusted position, said box being dimensioned so that the longest box dimension is substantially greater than the box depth, whereby said box may be slid along its length through an access passage in a cast slab having a longitudinal passage until it is in the longest passage and thereafter turned so that said lateral extensions rest on the slab material with the box in said access passage, said slotted angle irons being carried initially by said box in positions where the angle irons do not project beyond the box side and thereafter being adjustable laterally of said bolts as well as away from the box edge to lock the box in position.

References Cited in the file of this patent

UNITED STATES PATENTS

| | | |
|---|---|---|
| 1,636,135 | Hughes | July 19, 1927 |
| 1,808,011 | Barnet | June 2, 1929 |
| 2,357,787 | Windsheimer | Sept. 5, 1944 |
| 2,757,818 | Chamberlain | Aug. 7, 1956 |